United States Patent [19]
Austin

[11] Patent Number: 5,458,944
[45] Date of Patent: Oct. 17, 1995

[54] STRETCHABLE TUFTED CARPET AND STRETCHABLE NONWOVEN CARPET BACKING THEREFOR

[75] Inventor: Jared A. Austin, Greer, S.C.

[73] Assignee: Fiberweb North America, Inc., Simpsonville, S.C.

[21] Appl. No.: 228,431

[22] Filed: Apr. 15, 1994

[51] Int. Cl.⁶ ................ B32B 3/02; B32B 5/06; D04H 1/08
[52] U.S. Cl. .............. 428/95; 428/230; 428/231; 428/255; 428/258; 428/259; 428/300; 28/107; 28/109; 28/112
[58] Field of Search .............. 428/85, 95, 230, 428/231, 255, 258, 259, 300; 28/112, 109, 107

[56] References Cited

U.S. PATENT DOCUMENTS

| | | |
|---|---|---|
| 3,060,072 | 10/1962 | Parlin et al. ............... 428/95 |
| 3,819,465 | 6/1974 | Parsons et al. . |
| 4,096,302 | 6/1978 | Thibodeau et al. . |
| 4,159,360 | 6/1979 | Kim . |
| 4,169,176 | 9/1979 | Hartmann et al. . |
| 4,187,337 | 2/1980 | Romageon . |
| 4,258,093 | 3/1981 | Benedyk ............... 428/300 |
| 4,284,680 | 8/1981 | Awano et al. . |
| 4,296,163 | 10/1981 | Emi et al. . |
| 4,307,145 | 12/1981 | Goldman . |
| 4,427,734 | 1/1984 | Johnson ............... 428/300 |
| 4,504,537 | 3/1985 | Mussallem, Jr. . |
| 4,504,538 | 3/1985 | Mussallem, Jr. . |
| 4,622,253 | 11/1986 | Levy . |
| 4,636,419 | 1/1987 | Madsen et al. ............... 428/131 |
| 4,743,495 | 5/1988 | Lilani et al. . |
| 4,775,579 | 10/1988 | Hagy et al. . |
| 5,059,378 | 10/1991 | Petterson et al. ............... 428/286 |
| 5,380,580 | 1/1995 | Rogers et al. ............... 428/284 |

*Primary Examiner*—George F. Lesmes
*Assistant Examiner*—Terrel Morris
*Attorney, Agent, or Firm*—Bell, Seltzer, Park & Gibson

[57] ABSTRACT

Tufted carpets which are conformable and stretchable make use of a stretchable carpet backing formed from a composite fabric. The stretchable carpet backing fabric is formed of a stretchable elastic net and at least one nonwoven fibrous layer overlying the stretchable elastic net. The fibers of the fibrous layer extend through said elastic net to mechanically secure the fibrous layer to the elastic net and form a unitary coherent elastic fabric.

5 Claims, 1 Drawing Sheet

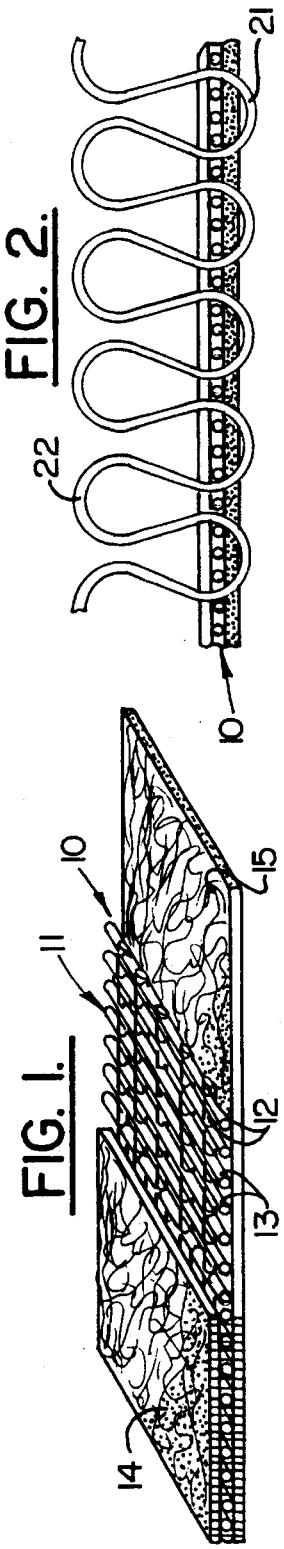
FIG. 1.
FIG. 2.
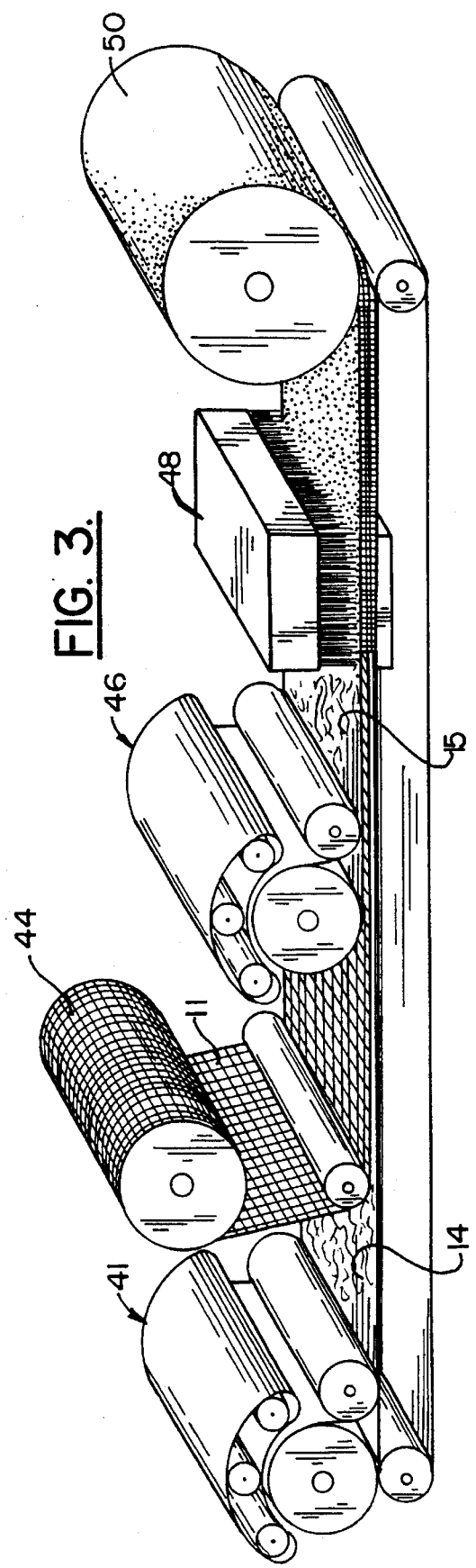
FIG. 3.

STRETCHABLE TUFTED CARPET AND STRETCHABLE NONWOVEN CARPET BACKING THEREFOR

FIELD OF THE INVENTION

This invention relates to tufted carpets and to backing fabrics for tufted carpets, and more particularly to a stretchable nonwoven backing fabric for carpets and a tufted carpet produced therefrom.

BACKGROUND OF THE INVENTION

Tufted carpets are widely used in home furnishings and automotive interiors. Much of the art in the design and manufacture of tufted carpets relates to making them dimensionally stable. The carpet backing fabric generally plays a major role in providing dimensional stability. The backing fabrics commonly used are woven fabrics. The most common backing fabric in use today is made from woven strips of polypropylene film. While this backing fabric has proven satisfactory for many applications, it does have disadvantages. The woven polypropylene strips sometimes are not completely hidden by the tufts, a situation referred to as "grin through". Adhesive used to augment the attachment of the carpet yarn to the backing fabric has difficulty penetrating the woven backing fabric to adequately bond the base of the tufts.

In order to circumvent these disadvantages, a needlepunched composite of staple fibers and a plastic net was developed and disclosed in U.S. Pat. No. 4,096,302. In this product, the net provides the dimensional stability while the staple fibers visually blend with the tufting fibers to eliminate "grin through". The relative openness of this composite allows backing adhesive to penetrate through to the tufts.

While carpets are most commonly used as floor coverings, they are frequently used in applications which require them to bend and conform to angles. Examples are the carpeting of stair steps and of the interiors of automobiles. The conformance of standard tufted carpets to shapes is frequently imperfect. The techniques used to make carpets dimensionally stable work against their bending and conforming to different shapes. One technique used to make carpets conform to various shapes is to mold them under heat and pressure, as disclosed for example in U.S. Pat. No. 4,169,176. However, there are many situations where this technique would be unsuitable.

SUMMARY OF THE INVENTION

This invention provides tufted carpets which are conformable by making them highly stretchable. It makes use of stretchable carpet backing formed from a composite fabric containing an elastic net. If the elastic net has substantial stretchability in the woof direction of the composite fabric, a tufted carpet prepared using this composite fabric as a backing is stretchable in the woof direction.

The composite backing fabric comprises an elastomeric net around which have been mechanically secured textile staple fibers. More particularly, at least one nonwoven fibrous layer formed of textile fibers overlies the stretchable elastic net, and fibers of the fibrous layer extend through the elastic net to mechanically secure the fibrous layer to the elastic net and form a unitary coherent elastic fabric. The securement is accomplished either by hydroentangling or by needlepunching processes known to the nonwovens industry.

BRIEF DESCRIPTION OF THE DRAWINGS

Some of the features of the invention having been stated, others will become apparent from the detailed description which follows, and from the accompanying drawings, in which FIG. 1 is a schematic fragmentary perspective view showing a composite stretchable carpet backing in accordance with the invention, with sections of the individual layers thereof broken away for clarity of illustration;

FIG. 2 is a schematic side cross sectional view of a tufted carpet produced with the carpet backing of FIG. 1; and FIG. 3 is a schematic view showing a process for producing a composite elastic carpet backing fabric by the needlepunching process.

DETAILED DESCRIPTION

The composite nonwoven fabric of this invention has two components: an elastic net and textile fibers. The net contains elastomeric strands running in at least one direction. Processes suitable for making this net are taught in U.S. Pat. Nos. 3,252,181 and 3,384,692 wherein a plurality of parallel longitudinal strands are extruded and a plurality of parallel transverse strands are extruded perpendicular to the longitudinal strands at spaced intervals. These net structures can be produced by extruding alternate streams of different polymers, so that the longitudinal strands contain one type of polymer and the transverse strands a second type of polymer. The nets most useful for this invention have elastomeric polymer in the transverse strands. If two different polymers are used in the net, these polymers must have sufficient attraction for one another to bond at the intersection of the strands. One or both of the longitudinal or transverse groups of strands are formed from a thermoplastic or crosslinked elastomeric material. Suitable thermoplastic elastomers include the diblock, triblock, radial or star copolymers based on polystyrene (S) and unsaturated or fully hydrogenated rubber blocks. The rubber block can consist of butadiene (B), isoprene (I), or the hydrogenated version, ethylene-butylene (EB).

For example, S-B, S-I, S-EB, as well as S-B-S, S-I-S, S-EB-S linear block copolymers can be used. Typically when used one or more of the diblock copolymers are blended with the triblock or the radial copolymer elastomers. Preferred thermoplastic elastomers of this type can include the KRATON polymers sold by the Shell Chemical Company or the VECTOR polymers sold by DEXCO. Other elastomeric thermoplastic polymers include polyurethane elastomeric materials such as ESTANE sold by BF Goodrich Company; polyester elastomers such as HYTREL sold by E. I. Du Pont De Nemours Company; polyetherester elastomeric materials such as ARNITEL sold by Akzo Plastics; and polyetheramide elastomeric materials such as PEBAX sold by ATO Chemical Company; and the like.

The elastic strands in the elastomeric net can also be prepared from blends of thermoplastic elastomers with other polymers such as polyolefin polymers, i.e., blends of KRATON polymers with polyolefins such as polypropylene and polyethylene, and the like. These polymers can provide lubrication and decrease melt viscosity, allow for lower melt pressures and temperatures and/or increase throughput. These polymers may also promote bonding of the strands at their intersections. In a particularly preferred embodiment of the invention, polymers can be included in the blend as a minor component, for example in the amount of from about 5% by weight up to about 50% by weight, preferably from about 10 to about 30% by weight. Suitable thermoplastic materials include poly(ethylene-vinyl acetate) polymers having an ethylene content of up to about 50% by weight, preferably between about 15 and 30% by weight, and copolymers of ethylene and acrylic acid or esters thereof, such as poly(ethylene-methyl acrylate) or poly(ethylene-ethyl acrylate) wherein the acrylic acid or ester component ranges from about 5 to about 50% by weight, preferably from about 15 to 30% by weight.

The elastic net preferably has a strand count of from 4×4 to about 12×18 per square inch and a weight of from about 20 grams per square meter to about 250 grams per square meter, preferably between 30 and 150.

In addition to nets derived from die extrusion processes, nets derived from film extrusion processes are also useful for this invention. One such process is described in U.S. Pat. No. 4,636,419.

A variety of textile fibers are useful in this invention. Because nylon fibers and filaments are predominant in carpet tufting yarns, these are the preferred fibers to be used in the composite fabric. Nylon fiber has the advantage of being dyeable by the same techniques used for the tufting yarns. Polyester, polypropylene, rayon, cotton and wool fibers could be used for the purposes of this invention. Staple fiber lengths ranging from ¾ inches to 6 inches are most suitable. Below ¾ inches the mechanical interlocking of the staple fibers is diminished and they are difficult to process through fiber handling equipment. Above 6 inches length, the fiber becomes difficult to force into the apertures of the net. Staple fiber deniers from 1.0 to 9 are satisfactory for this invention. The fiber layer preferably has a basis weight within the range of 70 to 400 grams per square meter.

FIG. 1 shows a composite nonwoven fabric 10 in accordance with the present invention. As illustrated, the fabric includes a central elastic component 11 and fibrous layers 14, 15 positioned on opposite sides of the elastic component 11. The elastic component in the embodiment shown comprises an elastic net formed of spaced apart longitudinal and transverse strands 12, 13 which intersect to form apertures. The longitudinal and transverse groups of strands are formed of an elastomeric material. The continuous elastic strands 12 extend in generally parallel spaced apart relation in the longitudinal or machine direction, and continuous elastic strands 13 extend crosswise at spaced locations along the extent of the net. Although shown extending perpendicular to one another, the two sets of strands 12, 13 need not be perpendicular, and may be arranged at various angles or orientations.

FIG. 2 shows a tufted carpet in accordance with the invention. Carpet yarns 21 are tufted thorough the nonwoven backing 10 to firm a series of loop pile tufts 22 on the front surface of the backing fabric 10.

A preferred process for making the carpet backing fabric of the invention is described in FIG. 3. A first layer 14 of carded staple fibers is deposited by a first textile carding machine 41 onto a moving conveyor 42. An elastic net 11 is unwound from a roll 44 on top of the card web 14 in a relaxed or unstretched state. A second carding machine 46 deposits a second layer 15 of carded staple fibers on top of the elastic net 11 as it moves down the conveyor. The web/net/web sandwich is transported to a needlepuncher 48 where the staple fibers are mechanically interlocked among themselves and around and through the strands of the net 11. The composite fabric is then wound up on a roll 50. If desired, the composite fabric may be placed on the unwind stand and passed through the needlepuncher a second time—the needles traversing the fabric in the reverse direction from the first pass. The general target is about 180 penetrations per square centimeter, with a range from about 50 penetrations per square centimeter to 300 penetrations per square centimeter.

An alternate approach is to mechanically secure the staple fibers to the net by hydroentangling. A card web/net/card web sandwich is formed by a technique identical to that used in FIG. 3. This "sandwich" is passed under the water jets of a hydroentanglement system at conditions typical for hydroentangling webs of staple fibers (see, for example, U.S. Pat. No. 3,485,706 and U.S. Pat. No. 4,775,579). The hydroentangled fabric is then dried and wound up. Many hydroentanglement systems allow for the treatment of the fabric with water jets from both sides. This can be used optionally with the present invention.

Generally, hydroentanglement is preferred when the card webs have a combined weight of less than 100 grams per square meter. With heavier concentrations of staple fibers, needlepunching provides more effective interlocking of the fibers with themselves and with the net. Needlepunching is also more effective with staple fibers of deniers greater than 3.

Examples of two composite nonwoven fabrics which illustrate the invention and one nonwoven fabric which does not fall under the claims of the invention follow:

EXAMPLE 1

Substrate Without Elastic Net

A carded web of 20 grams per square yard basis weight was prepared from a blend of 70% Hercules T-182 polypropylene staple fiber and 30% Hoechst-Celanese K-54 polyester/polyethylene bicomponent staple fiber. Lengths of four of these webs were layered and passed through a Dilo needlepunching machine outfitted with 15/18 40/3 C-222-62027 Groz-Beckert needles. The layered webs were needlepunched at a density of 90 penetrations per square centimeter. The resulting fabric was turned over and needlepunched at a density Of 90 penetrations per square centimeter on the other side.

EXAMPLE 2

Substrate With Single Component Elastic Net

An extruded net of Kraton elastomer containing 5 strands per inch in the machine direction and 5 strands per inch in the cross machine direction and weighing 110 grams per square yard was placed on top of two of the 70/30 polypropylene/bicomponent fiber card webs from Example 1. Two additional card webs were placed on top of the net and the structure was needlepunched on both sides at a density of 90 penetrations per square centimeter.

EXAMPLE 3

Substrate With Two Component Elastic Net

This substrate was identical to Example 2 with the exception that the net had 15 strands per inch of polyethylene in the machine direction and 8 stands per inch of Kraton elastomer in the cross machine direction and had a basis weight of 80 grams per square yard.

EXAMPLE 4, 5 and 6

Carpets

A two plied nylon staple yarn of 2.3 cotton counts was tufted into each of these substrates using a Singer Carpet Tufter. There were 9 tufts per inch in the machine direction and 7 rows of tufts per inch in the cross machine direction. Example 4 used the substrate from Sample 1. Example 5 used the substrate from Example 2. Example 6 used the substrate from Example 3.

Elongation Test

One by six inch (1"×6") specimens from Examples 4, 5, and 6 were placed in an Instron Tensile Tester and elongated 60% in the cross machine direction. The specimens were held at this extension for one minute, then allowed to relax to 0% extension. This elongation cycle was repeated a second time. Example 4, which did not contain an elastic net component, was irreversibly deformed by the stretching procedure. Examples 5 and 6 were not damaged by the stretching procedure, and behaved in a reproducible manner in the second stretching cycle.

That which is claimed is:

1. A stretchable carpet comprising (a) a stretchable backing fabric formed of a stretchable elastic net and at least one nonwoven fibrous layer overlying said stretchable elastic net, fibers of said fibrous layer extending through said elastic net to mechanically secure the fibrous layer to the elastic net and form a unitary coherent elastic fabric, and (b) carpet yarns secured to and extending upwardly from one surface of said backing fabric to form a pile carpet surface.

2. A stretchable carpet according to claim 1 wherein the fibers of said fibrous layer are needled through said elastic net, and wherein said carpet yarns are tufted through said backing fabric and extend to the rear surface of the backing fabric.

3. A stretchable carpet according to claim 1 wherein the fibers of said fibrous layer are staple fibers having a length of from ¾ inch to about 6 inches, and the fibrous layer has a basis weight of 70 grams per square meter to 400 grams per square meter.

4. A stretchable carpet according to claim 1 wherein said net comprises spaced apart longitudinal and transverse groups of strands, at least one of said longitudinal or transverse groups of strands being formed of an elastomeric material, said net having a strand count of from 4×4 to 12×18 per square inch and a weight of from about 20 to about 250 grams per square meter.

5. A stretchable carpet comprising (a) a stretchable backing fabric comprising a stretchable elastic net formed of spaced apart longitudinal and transverse groups of strands, at least one of said longitudinal or transverse groups of strands being formed of an elastomeric material, said net having a strand count of from 4×4 to 12×18 per square inch and a weight of from about 20 to about 250 grams per square meter, first and second nonwoven fibrous layers formed of textile fibers positioned on opposite sides of said elastic net, said fibrous layers having a basis weight of 70 grams per square meter to 400 grams per square meter, fibers of said first layer extending through said elastic net and into said second layer, and fibers of said second layer extending through said elastic net and into said first layer, whereby the net and the respective layers are secured together into a unitary coherent elastic fabric, and (b) carpet yarns tufted through and extending upwardly from one surface of said backing fabric to form a pile carpet surface.

* * * * *